United States Patent [19]

Powers

[11] Patent Number: 4,906,320

[45] Date of Patent: Mar. 6, 1990

[54] APPARATUS FOR INFRARED SEALING OF PLASTIC STRAP

[75] Inventor: Robert T. Powers, Homewood, Ill.

[73] Assignee: The Interlake Companies, Inc., Oak Brook, Ill.

[21] Appl. No.: 182,160

[22] Filed: Apr. 15, 1988

[51] Int. Cl.$^4$ .................................... B32B 31/24
[52] U.S. Cl. ........................ 156/379.8; 156/380.9; 156/499; 156/502; 156/522; 156/544
[58] Field of Search ............... 156/502, 73.1, 156, 156/157, 158, 272.2, 272.4, 275.1, 379.6, 379.8, 380.9, 499, 443, 389, 459, 497, 468, 522, 475, 583, 379.7, 538, 543, 544

[56] References Cited

U.S. PATENT DOCUMENTS

| | | |
|---|---|---|
| 3,247,041 | 4/1966 | Henderson . |
| 3,461,014 | 8/1969 | James . |
| 3,470,814 | 10/1969 | Tschappu ..................... 156/308.4 |
| 3,472,721 | 10/1969 | Abramson ..................... 156/502 |
| 3,549,451 | 12/1970 | Kugler . |
| 3,614,914 | 10/1971 | Troll . |
| 3,749,622 | 7/1973 | Sato ..................... 156/157 |
| 3,804,691 | 4/1974 | Trivedi . |
| 4,156,626 | 5/1979 | Souder . |
| 4,220,493 | 9/1980 | Wehr ..................... 156/502 |
| 4,288,270 | 9/1981 | Mossell et al. . |
| 4,420,352 | 12/1983 | Schroeder et al. . |
| 4,664,738 | 5/1987 | Tadros . |

FOREIGN PATENT DOCUMENTS 2103147 2/1983 United Kingdom .

OTHER PUBLICATIONS

Article by D. W. Dahringer and J. R. Shroff, entitled "Jar-Cover Seals". Bell System Technical Journal, vol. 49, No. 7, 9/70.

Primary Examiner—Merrell C. Cashion Jr.
Attorney, Agent, or Firm—Emrich & Dithmar

[57] ABSTRACT

A portable system provides a high-strength joint between two portions of radiant energy transmitting thermoplastic strap having an opaque radiant energy absorbing area on one surface thereof wherein the strap portions are overlapped so that the opaque area is at the interface therebetween. The overlapped strap portions are urged together by being tensioned over an arcuate guide surface. Infrared energy is directed through a free uncontacted outer surface area of one of the strap portions and onto the opaque area for melting the adjacent strap surfaces to form a joint.

12 Claims, 2 Drawing Sheets

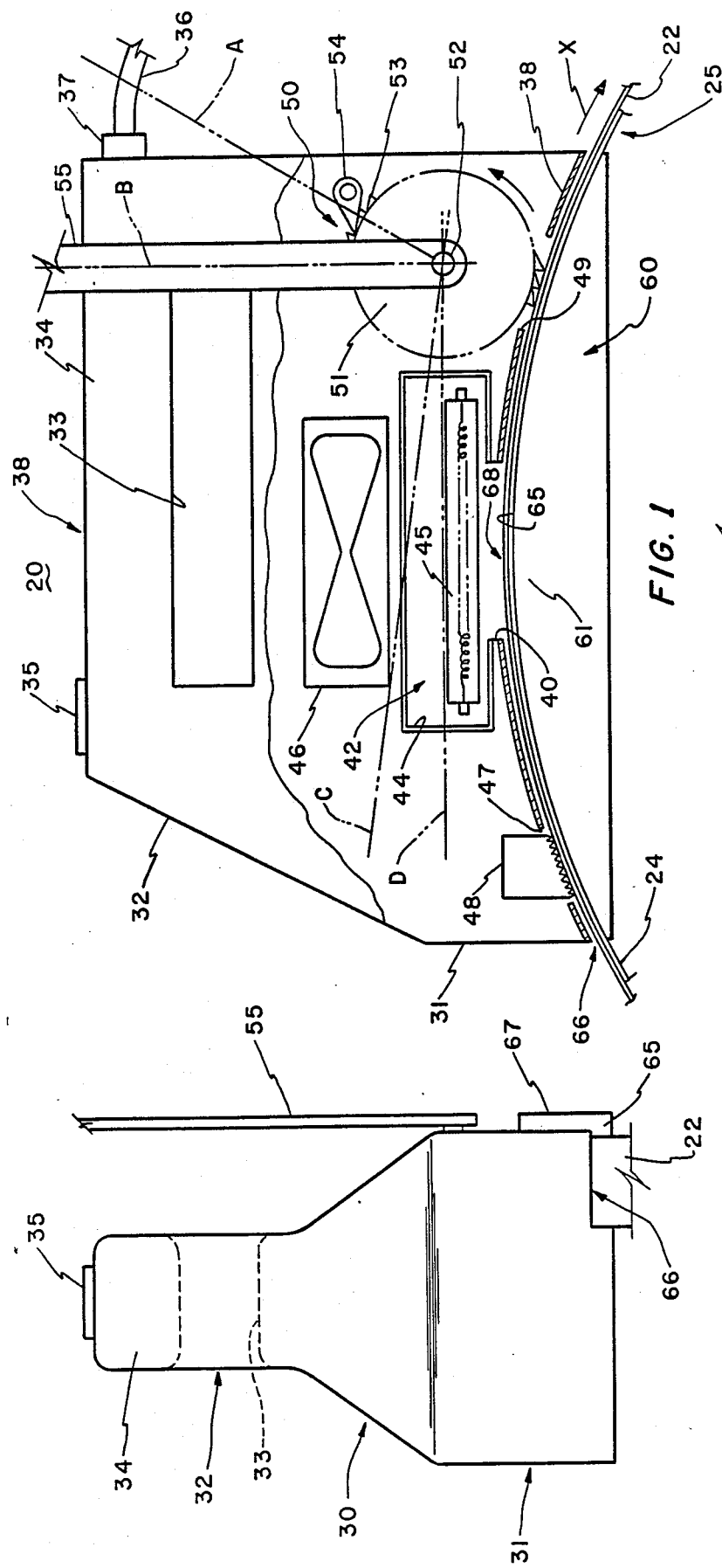
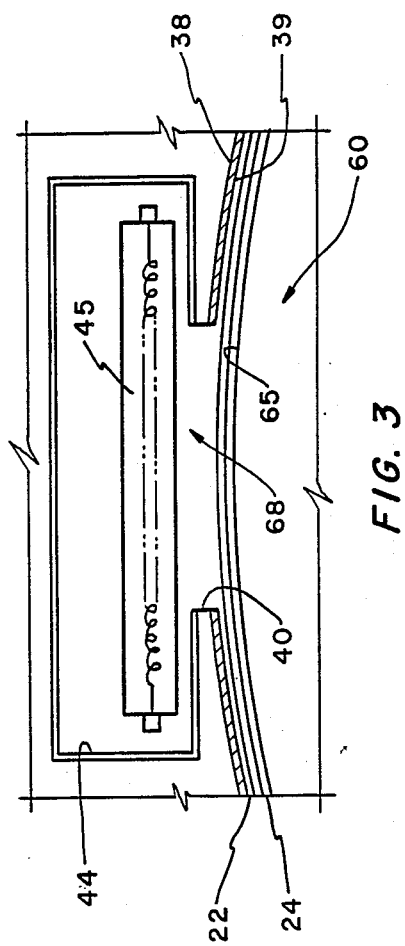

APPARATUS FOR INFRARED SEALING OF PLASTIC STRAP

BACKGROUND OF THE INVENTION

1. Field of the Invention

The present invention relates to systems for applying and sealing plastic strap around an object, and in particular to systems for forming a heat-sealed joint between overlapping portions of the plastic strap.

2. Description of the Prior Art

A number of prior techniques have been used to heat seal two portions of plastic strapping. These techniques have included the insertion of a hot knife between the overlapped strap portions to melt the facing strap surfaces; melting the facing strap surfaces by friction; ultrasonic welding of the strap portions; dielectric welding of the strap portions; the use of adhesives to join the strap portions together; and the use of radiant energy absorption by an opaque layer on one of the strap portions to melt the facing strap surfaces. The present invention relates to this latter technique of radiant energy strap sealing.

The heat sealing of plastic straps by the use of radiant energy is disclosed in United Kingdom published application U.S. Pat. No. 2,103,147, and entails the use of plastic strapping which is a composite of a relatively thick translucent layer and a relatively thin opaque layer. The strap portions to be joined are overlapped and are pressed against the window of a tungsten-halogen lamp assembly so that the opaque layer of the lamp-side strap portion is in pressure contact with the other strap portion. The overlapping strap portions are then irradiated through the window with a high intensity transmission of radiant energy, primarily in the visible wavelengths. This energy passes through the translucent layer of the lamp-side strap portion with little or no absorption, and is preferentially absorbed by the opaque layer, which melts and fuses to the other strap portion to form a heat sealed joint therewith on cooling after the lamp has been switched off.

While this prior system forms an effective, high-strength joint between the strap portions, it has been found to have certain practical operating disadvantages as a result of the necessity of clamping the strap portions against the lamp window. This clamping is necessary in order to ensure firm, uniform contact between the overlapping strap portions and to ensure that the strap portions are held stationary during the melting and fusing of the opaque layer, otherwise uneven and imperfect joints will result. But this clamping arrangement results in conduction of heat from the lamp window to the straps, since the lamp window is not perfectly transparent to radiant energy. The more rapid the operation of the sealing apparatus, the more the heat is absorbed by the window. This retained heat is, in turn, conducted from the window to the adjacent strap portions in succeeding cycles.

This tends to defeat one of the prime intended advantages of the radiant energy technique, i.e., the selective heating of only a thin opaque layer at the interface of the overlapping strap portions, without significant heat absorption by the remainder of the strap. Selective heating of only a thin surface layer substantially eliminates thermal degradation and resultant weakening of the remainder of the strap thickness. But conduction of heat from the window back into the strap tends to heat and thermally degrade the translucent portion of the strap.

Furthermore, the heat conducted into the strap from the window may be sufficient to reach the opaque layer and thereby effectively lower the heat contribution necessary from the lamp in order to attain optimal fusion of the strap portions. Thus, since the lamp is typically operated for a predetermined time period during each cycle, there will result overheating of the opaque layer and resultant heat conduction into and melting of the adjacent portions of the translucent layer. Indeed, it has been found that the lamp window may become so hot that it can start to melt the strap without any contribution at all from the lamp.

SUMMARY OF THE INVENTION

It is a general object of the present invention to provide an improved radiant energy apparatus and method for forming high-strength seal joints between plastic strap portions, which avoids the disadvantages of prior radiant energy systems while affording additional structural and operating advantages.

An important feature of the invention is the provision of a relatively simple and economical radiant energy method of joining thermoplastic strap portions.

Another important feature of the invention is the provision of a method of the type set forth, which is energy efficient.

Still another feature of the invention is the provision of a method of the type set forth which provides precisely controllable localized melting of the adjoining strap portions and minimizes thermal conduction into the remainder of the strap.

In connection with the foregoing features, it is another feature of the invention to provide an apparatus for performing the methods of the type set forth.

In connection with the foregoing feature, a still further feature of the invention is the provision of apparatus of the type set forth which is portable and lightweight.

These and other features of the invention are attained by providing a method of forming a high-strength seal joint between two portions of plastic strap, each being formed of a radiant energy transmitting thermoplastic material and having substantially flat opposed surfaces, the method comprising the steps of: providing a radiant energy absorbing area on at least one of the surfaces of at at least one of the strap portions, disposing the strap portions in overlapping engagement with each other with the radiant energy absorbing area disposed at the interface between the strap portions, exposing the radiant energy absorbing area to radiant energy by passing the radiant energy through one of the strap portions for melting a region of the strap portions at the engaged surfaces thereof, urging the overlapped strap portions against each other and restraining them against movement during irradiation without contacting the surface of the strap portions through which the radiant energy enters, and terminating the exposure of the radiant energy absorbing area to the radiant energy, thereby to form a joint between the urged-together portions of the strap upon cooling and resolidification of the melted region thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a sealing apparatus constructed in accordance with and embodying the features of the present invention, with portions of the structure broken away more clearly to show the interior construction;

FIG. 2 is an end elevational view of the apparatus of FIG. 1, as viewed from the left-hand end thereof;

FIG. 3 is an enlarged, fragmentary view of the sealing region of FIG. 1 and illustrating the tensioning of strap in the apparatus;

DESCRIPTION OF THE PREFERRED EMBODIMENT

Figure 4:
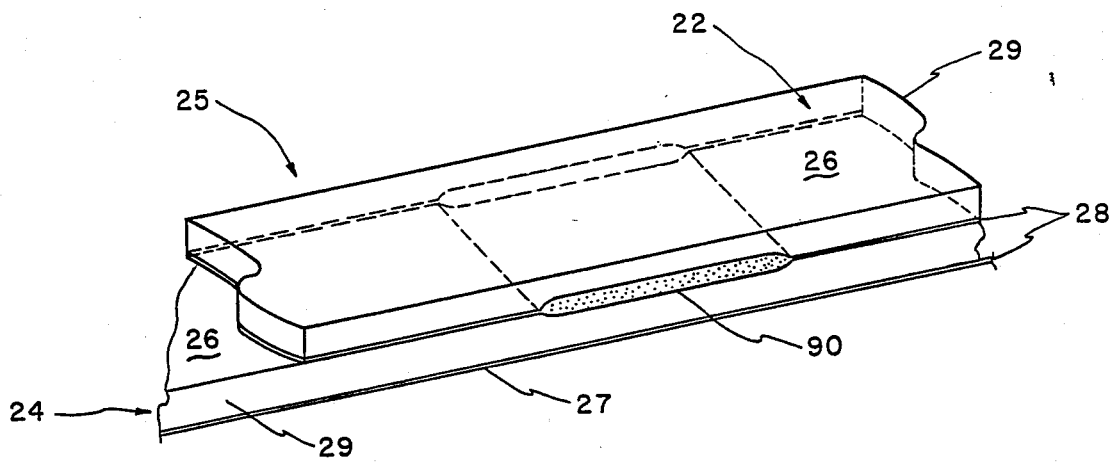
FIG. 4 is an enlarged, fragmentary, perspective view of two overlapped portions of strap having an opaque layer on one surface of the strap, and illustrating a joint formed between the strap portions by means of the present invention.

Referring to FIGS. 1-2, there is illustrated a sealing apparatus, generally designated by the numeral 20, constructed in accordance with and embodying the features of the present invention. The sealing apparatus 20 is a portable device for heat-sealing together portions 22 and 24 of thermoplastic strapping, the portions 22 and 24 typically being parts of the same strap 25, although they could be portions of two separate straps. Referring to FIG. 4, each strap portion 22 and 24 has substantially parallel flat opposed outer surfaces 26 and 27 and is formed of a radiant energy transmitting plastic material. More particularly, each of the strap portions 22 and 24 is substantially transparent or semi-transparent so as to be highly transmissive of radiant energy, particularly infrared energy. One of the surfaces 26 and 27 has a substantially opaque radiant energy absorbing area 28 thereon, the strap portions 22 and 24 being overlapped with the opaque area 28 at the interface therebetween, as will be explained in greater detail below.

As illustrated in FIG. 4, the strap 25 has a clear thermoplastic strap body 29 which is highly transmissive of infrared radiant energy. The opaque area 28 is in the form of an opaque thermoplastic layer which is physically integral with the body 29 and may be formed thereon by coextrusion, chemical grafting, laminating, or the like. The body 29 and the layer 28 may be formed of any suitable thermoplastic material, such as polyethylene, nylon, polypropylene, and the like, which exhibits sufficient tensile strength for use in strapping applications. It can be seen that the surface 27 of the strap 25 is defined on the outer surface of the layer 28, while the surface 26 is defined on the outer surface of the body 29.

It will be appreciated that the opaque area 28 could comprise an opaque marking formed on the surface 27 instead of a separate opaque layer. Such a marking may be formed of an opaque ink or other suitable material which has sufficient opacity to be highly absorbent of infrared radiant energy, but the marking is applied in a very thin coating, so as not to interfere with the bonding action. The marking could be formed along the entire length of the strap or along only a limited-length portion thereof. In the latter case, there could be provided a suitable marking device (not shown), either on the apparatus 20 or adjacent thereto, for marking one of the strap portions 22 or 24 immediately before they are brought into overlapping relationship with each other.

The sealing apparatus 20 includes a generally box-like housing 30 having a relatively wide bottom portion 31 and a relatively narrow top portion 32 having a rectangular aperture 33 therethrough for defining a thin handle portion 34. Mounted on the top of the housing 30 is a trigger switch 35 positioned so as to be operable by the thumb of the user when his fingers are extended through the aperture 33 and wrapped around the handle portion 34. An AC electric cord 36 is coupled to the housing 30 and is provided with a strain relief fitting 37 in a known manner.

The bottom of the housing 30 is closed by a base plate 38 which has a concave arcuate outer surface 39. Formed in the base plate 38 centrally thereof is a rectangular aperture 40 which communicates with a lamp chamber 42 disposed within the housing 30. Preferably, the walls of the lamp chamber 42 are covered with a radiant energy reflective lining 44, made of a suitable material, such as aluminum. Disposed within the chamber 42 are two infrared lamps 45 (one shown), which are preferably quartz infrared lamps. When the lamps 45 are energized, infrared radiant energy is transmitted through the aperture 40. Disposed above the chamber 42 is a fan 46, arranged to move air around the chamber 42 and outwardly through the aperture 40 for cooling purposes.

Also formed in the base plate 38 adjacent to one end thereof is an aperture 47 through which a gripper member 48 may project for reciprocating movement, as will be explained more fully below. Also formed in the base plate 38 adjacent to the other end thereof is an aperture 49 for a tensioning assembly 50. More specifically, the tensioning assembly 50 includes a tension wheel 51 mounted for rotation about the axis of a shaft 52. The tension wheel 51 is provided around the periphery thereof with gripping teeth 53 disposed for cooperation with an associated pawl 54, so that the tension wheel 51 is rotatable in use only in a counterclockwise direction, as viewed in FIG. 1. The tensioning assembly 50 also includes an elongated lever arm 55, which is disposed outside the front wall of the housing 30 and is fixedly secured at one end thereof to the outer end of the shaft 52.

Disposed beneath the housing 30 is a platen 60 which includes a solid body 61 fixedly secured at the rear end thereof to the housing 30. The body 61 is provided with an arcuate upper surface 65, which has substantially the same curvature as the arcuate surface 39 of the base plate 38 and is spaced therebelow a predetermined fixed distance for cooperation therewith to define therebetween an arcuate slot 66, which extends the entire length of the housing 30 and is dimensioned for receiving two thicknesses of the associated strap 25 therein. Preferably, the platen 60 projects forwardly a slight distance beyond the front wall of the housing 30 so as to define a projecting lip or edge 67 to facilitate sliding of the strap sidewise into the slot 66, as will be explained more fully below. The portion of the slot 66 immediately beneath the aperture 40 defines a sealing region 68.

In FIG. 1, the lever arm 55 is shown in solid line in an intermediate position B, and other positions being indicated by axes shown in broken line, and respectively designated A, C and D. In normal operation, the lever arm 55 is pivotally movable about the axis of the shaft 52 between the positions B and C for tensioning the strap. When the lever arm 55 moves in the counterclockwise direction, it rotates the tension wheel 51, and when it moves in the clockwise direction, it moves the shaft 52 independently of the tension wheel 51, the latter being held against rotation by the pawl 54. Thus, tensioning is accomplished by a ratcheting-type operation of the lever arm 55, in a known manner.

Preferably, there are soft detents provided at the positions B, C and D so that the operator will know when he has reached these positions. When the strap has been tensioned the desired amount, the lever arm 55 is moved past the detent at the position C, thereby actuating suitable mechanical linkage (not shown) to move the gripper 48 downwardly through the aperture 47 to a gripping position for cooperation with the platen 60 to securely grip the strap 25 therebetween. At the position D there is a stop to prevent further movement of a lever arm 55. In moving to that position, the lever arm 55 also actuates suitable linkage (not shown) for operating a cutter or knife 84 (see FIG. 5) to sever the supply portion of the strap 25, preferably just to the left of the tension wheel 51, as viewed in FIG. 1.

When the lever arm 55 is moved past the detent at position B to the position A, it shifts the shaft 52 upwardly for translating the tension wheel 51 to a release position withdrawn upwardly out of the slot 66 to facilitate removal of the sealed strap and insertion of a new strap, all in a well known manner.

Figure 5:
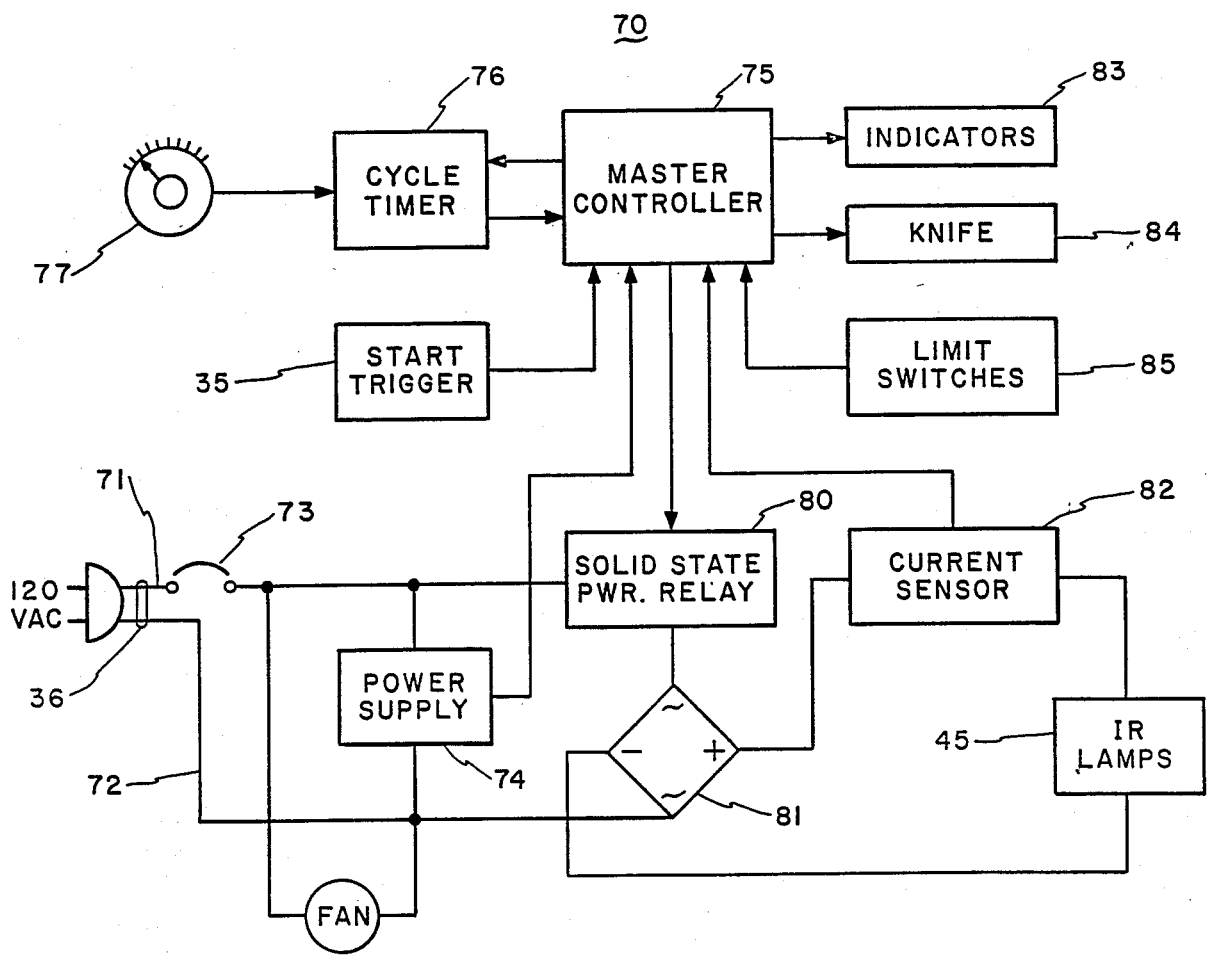
FIG. 5 is a partially schematic and partially block diagram of a control circuit for controlling the operation of the sealing apparatus of FIG. 1.

Referring now to FIG. 5, the sealing apparatus 20 includes a control circuit 70, which may be mounted on a suitable circuit board (not shown) within the housing 30. The AC power cord 36 is adapted to be plugged into an associated source of 120 VAC, 60 hertz power, the conductors 71 and 72 of the cord 36 being coupled through a circuit breaker 73. A suitable power supply 74 is connected across the AC conductors 71 and 72 to produce a DC supply voltage, which is in turn applied to a master controller 75, which may include a suitable integrated circuit microprocessor operating under stored program control. The master controller 75 is coupled to a cycle timer 76, which is in turn coupled to a manual timer adjustment knob 77, which is preferably disposed inside the housing 30 and can be factory adjusted to set the maximum exposure time for the infrared radiant energy. The trigger switch 35 is also coupled to the master controller 75.

Also connected in series across the AC line are a solid state power relay 80 and the AC arms of a rectifying bridge 81, which may be a diode bridge. Connected in series across the DC arms of the bridge 81 are the series connection of suitable current sensors 82 and the infrared lamps 45, the current sensors 82 having an output connected to the master controller 75. Also connected to the master controller 75 are suitable indicators 83, the knife 84 and limit switches 85. Preferably, the fan 46 is connected across the AC line so that it runs whenever the sealing apparatus 20 is plugged in.

In operation of the sealing apparatus 20, a strap 25 is first wrapped around the object to be strapped. Then the supply portion 22 of the strap 25 is overlapped with the leading end portion 24 thereof with the opaque area 28 disposed at the interface between the strap portions 22 and 24, as is best illustrated in FIGS. 3 and 4. The lever arm 55 of the tensioning assembly 50 is disposed in its position A, holding the tensioning wheel 50 in its release or retracted position. Then the sealing apparatus 20 is positioned on top of the object to be strapped and the overlapped strap portions are slid sidewise into the slot 66 between the base plate 38 and the platen 60, so that the strap portions 22 and 24 will overlap along the entire length of the arcuate surface 65. It will be appreciated that the slot 66 has a depth sufficient to accommodate various widths of strap and the aperture 40 has a depth such that it extends all the way to the back wall of the slot 66, to ensure that the full width of the strap will be in registry with the aperture.

When the overlapping strap portions 22 and 24 are thus positioned in the slot 66, the operator moves the lever arm 55 past the position B to shift the tension wheel 51 into engagement with the upper or supply portion 22 of the strap. Continued movement of the lever arm 55 to the position C will rotate the tension wheel 51 for moving the supply portion 22 of the strap in a tensioning direction, as indicated by the arrow X in FIG. 1. The operator then oscillates the lever arm 55 repeatedly between the positions B and C until the desired tension has been reached. This tensioning operation will not move the leading end portion 24 of the strap, since the friction between the leading end portion 24 and the platen 60 is much greater than the friction between the overlapped strap portions 22 and 24. In this regard, the arcuate surface 65 of the platen 60 may be a roughened friction surface, if desired.

After the strap 25 has been sufficiently tensioned, a suitable tension sensing mechanism (not shown) may be actuated to provide a suitable indication by one of the indicators 83. One suitable type of tension sensing mechanism may constitute a resilient mounting of the platen 60, such as on Belleville springs or the like, which yield when the predetermined tension is reached to actuate a suitable switch. Alternatively, torque sensing apparatus could be provided in connection with the shaft 52 of the lever arm 55. When the predetermined tension is reached, the lever arm 55 is moved past the position C for moving the gripper 48 to its gripping position for securely clamping the overlapped strap portions 22 and 24 between the gripper 48 and platen 60. The continued movement of the lever arm 55 to the position D will cause a continued tensioning rotation of the tension wheel 51 for tensioning the upper or supply portion 22 of the strap between the gripper 48 on the tensioning wheel 51.

The parts are configured so that the movement of the lever arm 55 from the position C to the position D will impart a predetermined minimum tension to the supply portion 22 of the strap. Because the strap is being tensioned over an arcuate surface 65, the tension force in the strap will have a vertical transverse component as well as a component longitudinally of the strap. This transverse vertical force component serves to securely urge the overlapped strap portions 22 and 24 against the platen 60 in the sealing region 68, thereby serving to hold the strap portions 22 and 24 motionless and in firm engagement with each other in the sealing region without contacting the strap surface facing the aperture 40 in the vicinity of the lamps 45.

It will be appreciated that a transverse force component will be exerted in the strap portions 22 and 24 throughout the tensioning operation. But in certain applications, such as in the strapping of certain compressible materials, little or no tension is required in the strap for purposes of holding the strapped object, since the expansion of the object material after strapping will securely hold the strap against the strapped object. In such cases, the gripper 48 serves the purpose of ensuring that there will be a predetermined minimum tensioning of the supply portion of the strap 22, so that there will in turn be a predetermined minimum force exerted on the strap against the platen 60, sufficient to effect proper joint formation.

Preferably, movement of the lever arm 55 to the position D will also actuate one of the limit switches 85 to cause the master controller 75 to activate a suitable one of the indicators 83 to inform the operator that the strap is ready for sealing. In this regard it will be appreciated that the master controller 75 is supplied with DC power as soon as the sealing apparatus 20 is plugged in.

At this point, the operator actuates the trigger switch 35, which signals the master controller 75, to initiate a lamp energization cycle, the duration of which is controlled by the cycle timer 76. The master controller 75 is programmed so that, upon closure of the trigger switch 35, the solid state power relay 80 is switched to its closed condition for applying AC power to the rectifying bridge 81, thereby applying rectified AC power to the infrared lamps 45 for energizing them. The lamps 45 are energized at full intensity, thereby emitting infrared radiant energy which is transmitted through the aperture 40 and through the clear body of the upper strap portion 22 to the opaque area 28. Upon exposure of the opaque area 28 to the infrared energy, it absorbs the energy, heating the adjacent areas of the strap portions 22 and 24 contiguous thereto and melting them so that they flow together and fuse.

The length of time that the infrared lamps 45 are energized is controlled by the cycle timer 76, which is in turn set by the adjustment of the manual adjustment knob 77. Typically, the lamps 45 may be energized for approximately two seconds, after which the master controller 75 opens the power relay 80 and deenergizes the lamps 45, thereby terminating the exposure of the opaque area 28 to infrared radiant energy. It has been found that this length of time is sufficient to melt the facing surfaces of the overlapping strap portions enough to form the joint, while limiting the depth to which the overlapping strap portions 22 and 24 are melted to a small fraction of the thickness thereof, thereby preventing thermal degradation of the strap portions 22 and 24 except near the interface therebetween. When the radiant energy has been turned off, the melted strap regions rapidly cool and resolidfy in approximately two seconds, thereby forming a firm joint 90 (see FIG. 4) between the strap portions.

After the joint 90 has had time to cool, the master controller 75 will activate a suitable one of the indicators 83 to signal the operator that the joint formation is complete. At this juncture, the operator moves the lever arm 55 just past the position D, thereby actuating a suitable one of the limit switches 85 to cause the knife 84 to be actuated to sever the supply portion 22 of the strap just to the left of the tension wheel 51. Then, the operator returns the lever arm 55 to the position A, thereby releasing the gripper 48 and the tensioning assembly 50 to permit removal of the sealed strap 25 from the slot 66.

Since the fan 46 is connected directly across the AC line, it runs all the time that the sealing apparatus 20 is plugged in, so as to prevent the buildup of heat in the platen 60. If desired, the fan 46 could be connected so as to operate under the control of the master controller 75. The current sensor 82 monitors the condition of the infrared lamps 45, the condition of which can be signaled by suitable ones of the indicators 83. If desired, the gripper 48 and the knife 84 could be solenoid-operated, in which case the solenoids could be actuated by closure of limit switches at the positions C and D of the lever arm 55.

It is a significant feature of the invention that it requires the use of only two one-kilowatt bulbs, which are operated for only a very short period of time during each sealing cycle. Thus, the system and method of the present invention are highly energy efficient. Another significant advantage of the present invention is that it permits concentration of the heating energy at the interface between the strap portions, and prevents significant penetration of heat into the remainder of the strap portions without contacting the strap surface which faces the radiation source. This serves to effect rapid melting of the engaged surfaces of the strap portions, while effectively minimizing thermal degradation of the remainder of the strap. Furthermore, the present invention permits a precisely controllable and accurately repeatable process. Because the melted regions of the overlapping strap portions do not come into contact with a mechanical heating element, there is minimal emission of smoke or noxious fumes.

Another significant advantage of the present invention is that the short duration of exposure to infrared energy permits the infrared lamps 45 to be positioned in close proximity to the strap 25, and be contained in a housing 30 which affords a very compact design, greatly facilitating portability.

It has been found that with the use of the present invention, seal joints between thermoplastic strap portions can be effected with near 100% joint efficiency, i.e., the resulting joint has a strength approaching or equaling the ultimate strength of the strap itself.

While in the preferred embodiment of the invention, the aperture 40 has a width greater than the width of the strap so as to expose the opaque area 28 to infrared energy along the entire width of the strap, it will be appreciated that, if desired, the aperture 40 could be made of any size or shape. Thus, the present invention can provide a masking technique to selectively vary the size and shape of the joint region.

While, in the preferred embodiment the desired transverse force holding the overlapping strap portions 22 and 24 together is achieved by longitudinally moving the supply portion 22 of the strap in a tensioning direction over an arcuate platen, the same result could be achieved in another way. Thus, for example, the overlapping strap portions 22 and 24 could be disposed over a flat horizontal guide surface with an opening therein immediately beneath the sealing region 68. The overlapping strap portions could then be clamped on both sides of the sealing region 68, and an arcuate surface on a lower platen could be moved up through the opening in the guide plate and into engagement with the overlapped strap portions to displace them upwardly and thereby provide the desired urging force therebetween.

From the foregoing, it can be seen that there has been provided an improved apparatus and method for forming a high-strength heat sealed joint between portions of thermoplastic strap. More specifically, the present invention provides a system which is of simple and economical construction and operation, which provides a very rapid seal formation, which effectively restrains the strap portions to be joined against movement during the joint-forming operation without mechanically clamping the strap within the sealing region, which provides an extremely uniform and concentrated heating only at the strap interface with minimal thermal degradation of adjacent regions of the strap, which affords high reliability and repeatability, and which provides a joint strength approaching or equaling the ultimate strength of the strap itself.

I claim:

1. Apparatus for forming a high-strength seal joint between two overlapped portions of plastic strap each formed of radiant energy transmitting material, wherein at least one of the overlapped strap portions has a thermoplastic region including an area of radiant energy absorbing material disposed in facing relationship with the other overlapped strap portion, said apparatus comprising: a source of radiant energy, urging means for placing the overlapped strap portions under tension along a curved path so that the overlapped strap portions are means for placing the overlapped strap portions under tension along a curved path so that the overlapped strap portions are urged into engagement with each other while they are being placed under tension, and means spaced from said overlapped strap portions for directing the radiant energy through a sealing region of one of the urged-together portions of the strap and onto the radiant energy absorbing area for heating the area and melting the adjacent thermoplastic region, said means for directing not contacting the urged together strap portions at the sealing region, whereby the overlapped strap portions are fused together without clamping for forming a joint therebetween upon cooling and resolidification of the melted thermoplastic region.

2. The apparatus of claim 1, wherein said urging means includes guide means defining the curved path.

3. The apparatus of claim 2 wherein said curved path is arcuate in shape.

4. The apparatus of claim 1, wherein the source of radiant energy is an infrared source.

5. The apparatus of claim 1, wherein the two strap portions are one the same strap, and further comprising cutter means for severing the joined strap portions from supply portions of the strap.

6. Apparatus for forming a high-strength seal joint between two overlapped portions of plastic strap each formed of radiant energy transmitting material, wherein at least one of the overlapped strap portions has a thermoplastic region including an area of radiant energy absorbing material disposed in facing relationship with the other overlapped strap portion, said apparatus comprising: a source of radiant energy, guide means having a convex arcuate surface disposed in contact with one of the overlapped strap portions to define an arcuate path for the overlapped strap portions, means for tensioning at least the other one of the overlapped strap portions over said arcuate guide surface to a sealing configuration wherein the overlapped strap portions are firmly urged into engagement with each other with the other one of the strap portions having a free outer surface area exposed to the atmosphere and facing said source of radiant energy, and means spaced from said overlapped strap portions for directing the radiant energy through said free outer surface area of the other one of said overlapped strap portions and onto the radiant energy absorbing area for heating the area and melting the adjacent thermoplastic region, said means for directing not contacting the urged together strap portions at the sealing region, whereby the overlapped strap portions are fused together without clamping for forming a joint therebetween upon cooling and resolidification of the melted thermoplastic region.

7. The apparatus of claim 6, wherein said arcuate guide surface is fixed, said tensioning means including means for moving the strap portions longitudinally over said arcuate guide surface.

8. The apparatus of claim 6, and further comprising means for inhibiting increase of tension in said one of the overlapped strap portions.

9. The apparatus of claim 8, wherein said inhibiting means includes means for clamping the overlapped strap portions against said guide surface.

10. The apparatus of claim 6, wherein said source of radiant energy is an infrared source.

11. The apparatus of claim 6, and further comprising means for controlling the duration of exposure of the radiant energy absorbing area to the radiant energy.

12. Apparatus for forming a high-strength seal joint between two overlapped portions of plastic strap each formed of radiant energy transmitting material, wherein at least one of the overlapped strap portions has a thermoplastic region including an area of radiant energy absorbing material disposed in facing relationship with the other overlapped strap portion, said apparatus comprising: a source of radiant energy, urging means for placing the overlapped strap portions in a sealing configuration wherein they are firmly urged into engagement with each other and restrained against movement with respect to each other with at least one of the strap portions having a free outer surface area exposed to the atmosphere and facing said source of radiant energy, and means spaced from said overlapped strap portions for directing the radiant energy through said free outer surface area of said one of said overlapped strap portions and onto the radiant energy absorbing area for heating the latter area and melting the adjacent thermoplastic region, said means for directing not contacting the urged together strap portions at the sealing region, whereby the overlapped strapped portions are fused together without clamping for forming a joint therebetween upon cooling and resolidification of the melted thermoplastic region.

* * * * *